United States Patent [19]
Newstead et al.

[11] 3,828,898
[45] Aug. 13, 1974

[54] HYDRAULIC ACTUATING MEANS FOR VEHICLE BRAKES

[75] Inventors: Charles Newstead, Walsall; Andrew Charles Walden Wright, Lapworth, both of England

[73] Assignee: Girling Limited, Birmingham, England

[22] Filed: Feb. 10, 1972

[21] Appl. No.: 225,088

[30] Foreign Application Priority Data
Feb. 17, 1971 Great Britain................ 4874/71

[52] U.S. Cl................ 188/345, 92/75, 188/106 P, 188/364
[51] Int. Cl.............................................. B60t 11/24
[58] Field of Search.... 188/106 P, 345, 364, 151 A; 60/54.6 M; 92/50, 69, 75

[56] References Cited
UNITED STATES PATENTS
3,608,678  9/1971  Kobayashi.................. 188/345
3,682,049  8/1972  Gee et al. .................. 188/345

FOREIGN PATENTS OR APPLICATIONS
110,340  3/1964  Czechoslovakia............ 92/75

Primary Examiner—George E. A. Halvosa
Attorney, Agent, or Firm—Scrivener Parker Scrivener & Clarke

[57]  ABSTRACT

In a brake actuator comprising a double-ended hydraulic cylinder in which work opposed pistons acting on movable friction members of the brake, an outer piston working in each end of the cylinder has in its inner end a blind axial bore in which works an inner piston, and fluid under pressure is supplied to the closed end of the bore to urge the outer and inner pistons apart, axial movement of each inner piston being transmitted mechanically to the outer piston working in the opposite end of the cylinder.

6 Claims, 15 Drawing Figures

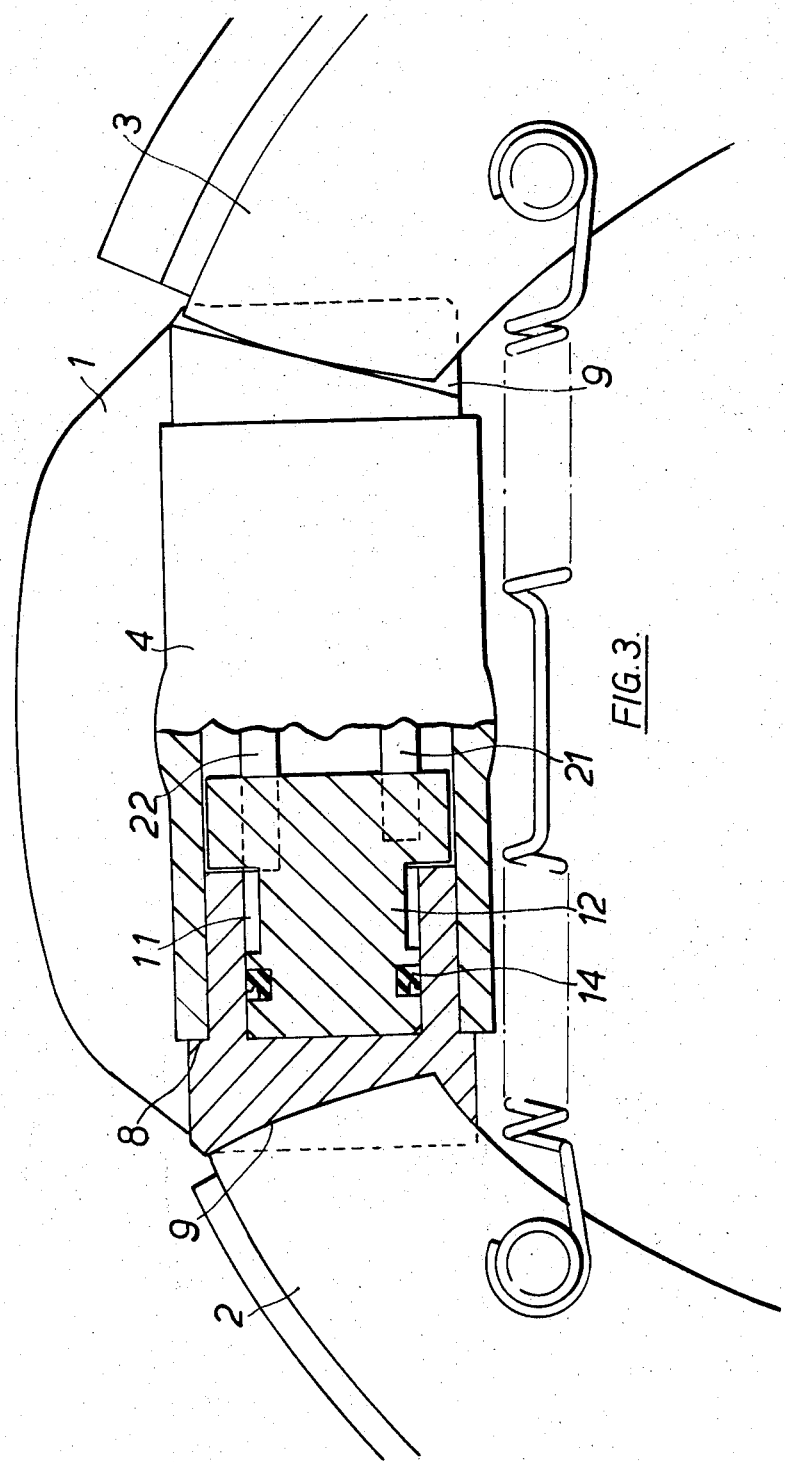

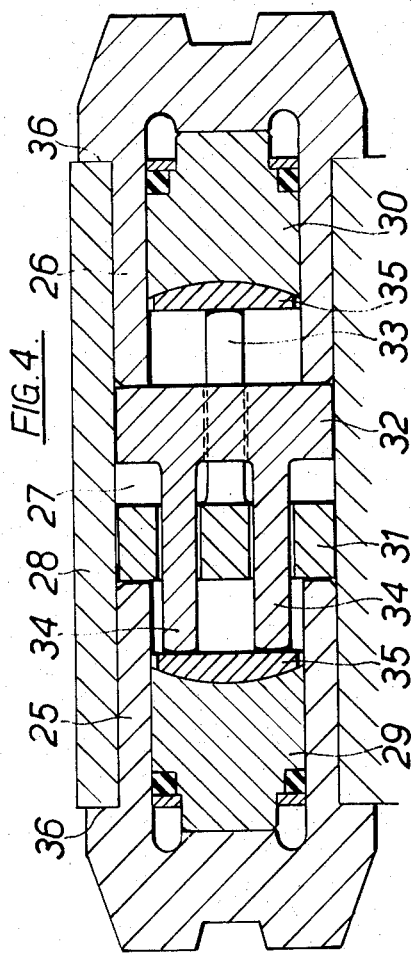
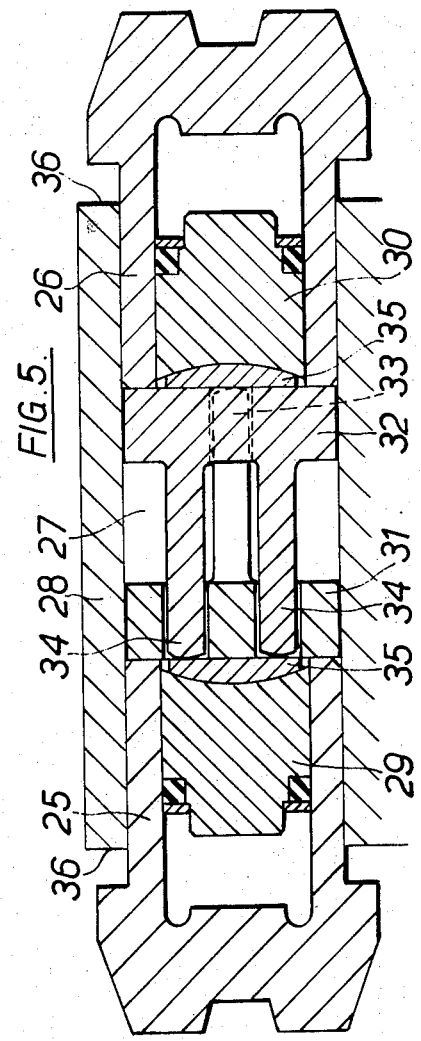

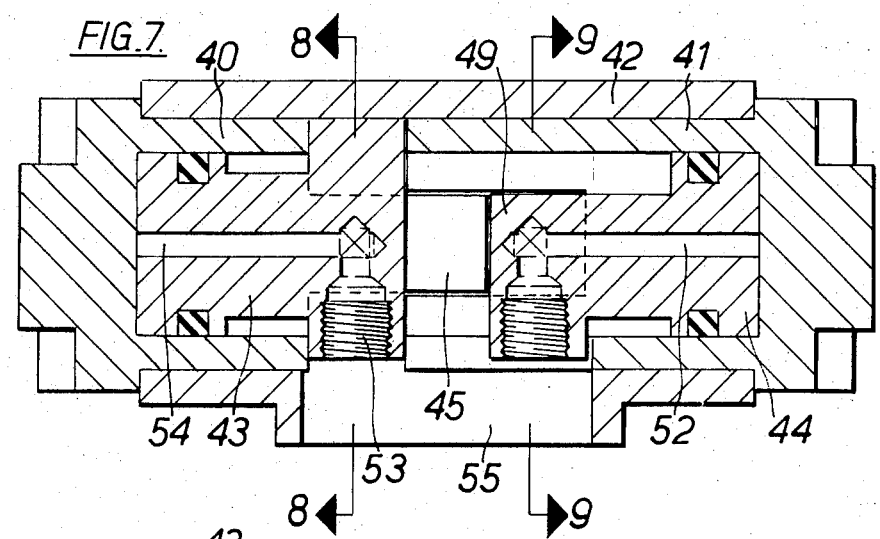
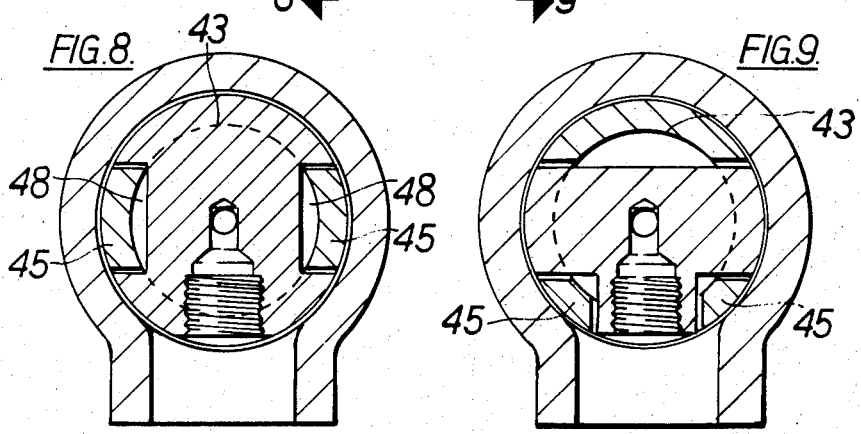
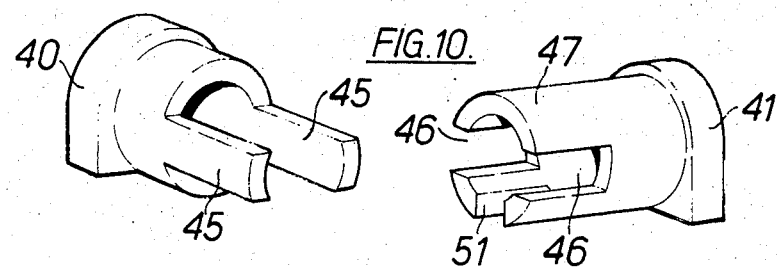
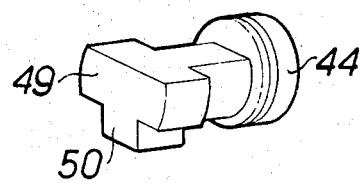

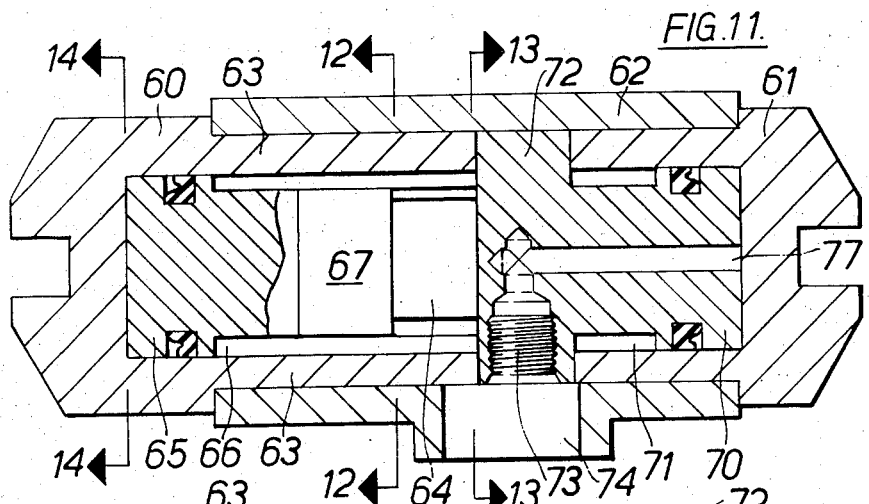
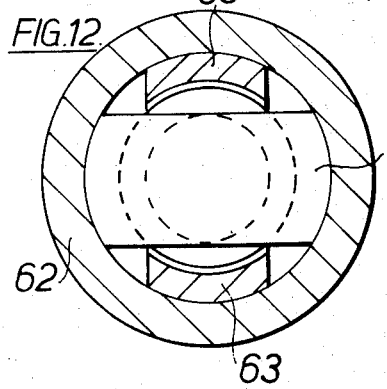
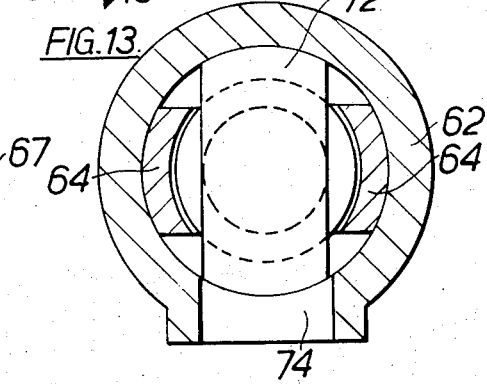
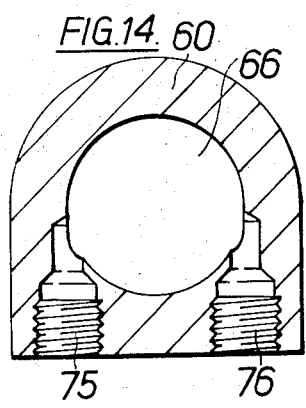
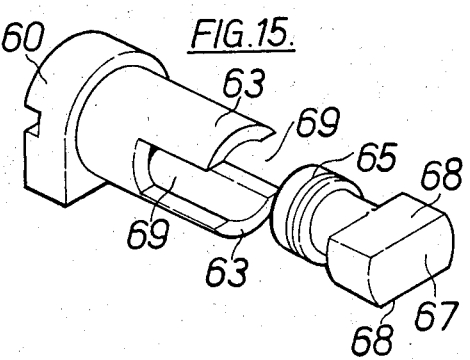

HYDRAULIC ACTUATING MEANS FOR VEHICLE BRAKES

This invention relates to improvements in brakes for vehicles and is concerned with hydraulic actuating means for the movable friction members of such brakes.

According to our invention an hydraulic actuator for the movable friction members of a brake comprises a double-ended cylinder adapted to be mounted on a stationary part of the brake assembly, an outer piston working in each end of the cylinder, an inner piston working in a blind bore in the inner end of each outer piston, mechanical means for transmitting axial movement of each inner piston to the outer piston at the other end, and means for supplying fluid under pressure to the outer end of each inner piston to urge it and the outer piston in which it works in opposite directions.

Fluid under pressure is supplied to the outer ends of the two inner pistons from separate pressure sources which may be the two pressure spaces of a tandem master cylinder or two separate master cylinders.

Normally fluid will be supplied to the outer ends of both inner pistons but if either pressure source or a pipe line from it should fail the brake can still be applied by fluid from the other source. No extra fluid is required from the second source so that a master cylinder of normal dimensions can be employed.

The transmission of movement of an inner piston to the outer piston at the outer end of the cylinder may be effected by any convenient means. In one arrangement thrust rods parallel to the axis of the cylinder are fixed in an inner piston and pass slidably through the other inner piston to bear on the outer piston in which the second inner piston works.

Fluid under pressure may be conveyed to the inner pistons by flexible pipes connected to inlets in the pistons adjacent to their inner ends which are accessible through an opening in the wall of the cylinder about the centre of its length, the inlets communicating with axial passage in the pistons extending through to their outer ends.

Several practical forms of actuator in accordance with our invention have been illustrated by way of example in the accompanying drawings in which:

FIG. 3 is an elevation, partly sectioned in a plane at right angles to the plane of section of FIG. 1, of the actuator in position in a brake;

FIG. 4 is a longitudinal section of another form of actuator with the movable parts in their static positions;

FIG. 5 is a similar section showing the parts in the positions they assume when the brake is fully applied with both hydraulic systems operative;

FIG. 7 is a longitudinal section of another embodiment;

FIG. 8 is a cross-section on the line 8—8 of FIG. 7;

FIG. 9 is a cross-section on the line 9—9 of FIG. 7;

FIG. 10 is a perspective view of the two outer pistons and one inner piston of the actuator shown in FIG. 7;

FIG. 11 is a longitudinal section of a still further embodiment;

FIG. 12 is a cross-section on the line 12—12 of FIG. 11;

FIG. 13 is a cross-section on the line 13—13 of FIG. 11;

FIG. 14 is a cross-section on the line 14—14 of FIG. 11; and

FIG. 15 is a perspective view of one outer piston and one inner piston of the actuator shown in FIG. 11.

Figure 1:
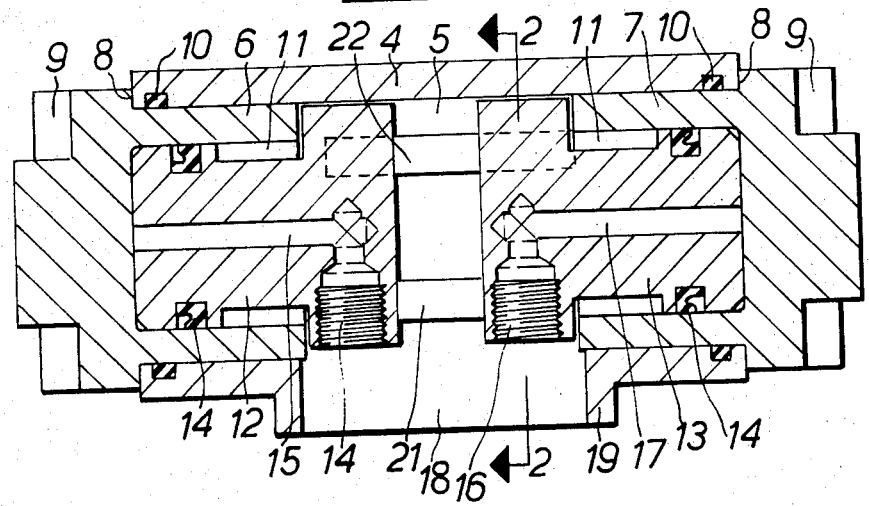
FIG. 1 is a longitudinal section of one form of actuator for the separation of the shoes of a shoedrum brake.
Figure 2:
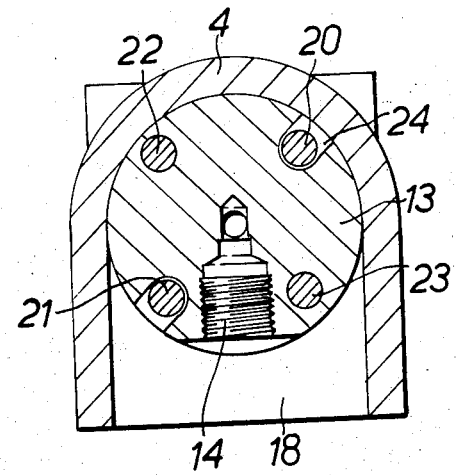
FIG. 2 is a cross-section on the line 2—2 of FIG. 1.

The actuator shown in FIGS. 1 to 3 is designed for the application of a brake of the shoe-drum type. The actuator is mounted on the stationary back-plate 1 of the brake between the adjacent ends of opposed shoes 2, 3.

The cylinder 4 of the actuator has a through bore 5 open at both ends. Working in opposite ends of the bore are outer pistons 6 and 7. Each piston has outside the cylinders a radial shoulder or flange 8 limiting its inward movement, and a slot 9 is formed in the outer end of the piston to receive the end of the web of the adjacent shoe. The pistons are sealed by O-rings 10 or equivalent seals located in annular grooves in the cylinder bore.

A cylindrical axial blind bore 11 is formed in the inner end of each outer piston and working respectively in these bores are inner pistons 12, 13. A cup seal 14 is located in an annular groove in each inner piston. The inner ends of the pistons 12, 13 are enlarged in diameter and are just clear of the inner end of the outer pistons when the outer ends of the inner pistons engage the closed ends of the bores 11 in the outer pistons as shown in the drawings.

An inlet 14 in the enlarged inner end of the piston 12 leads into an axial passage 15 extending through to the outer end of the piston for conveying fluid under pressure to the closed end of the bore 11.

A similar inlet 16 in the piston 13 leads into a similar axial passage 17 in that piston.

The inlets 14 and 16 are adapted to receive connectors on flexible pipes from separate pressure sources, the inlets being accessible through an opening 18 in the wall of the cylinder. A flange 19 around that opening may serve for the mounting of the actuator on the back-plate of the brake.

In addition to the inlets 14 and 16 there will also be bleed ports (not shown) located at any convenient position and in communication with the blind bores 11.

The assembly includes four thrust rods 20, 21, 22, 23 parallel to the axis of the cylinder and equally spaced from it. Two of these rods, 20 and 21, are fixed in the inner piston 12 and pass freely through grooves 24 in the enlarged inner end of the inner piston 13 parallel to its axis, their free ends bearing on the inner end of the outer piston 7. The other two rods 22 and 23 are fixe in the inner piston 13 and pass freely through corresponding grooves in the enlarged inner end of the inner piston 12, their free ends bearing on the inner end of the outer piston 6.

When fluid under pressure is supplied to the inlet 14 it flows through the axial passage 15 in the inner piston 12 to the outer end of the passage and applies pressure to the inner end of the bore 11 in the outer piston 6 and to the outer end of the inner piston 12 to urge the outer piston outwardly and the inner piston inwardly in the cylinder. The axial movement of the inner piston 12 is transmitted through the rods 20 and 21 to the outer piston 7 to move that axially outwards.

Similarly, fluid under pressure supplied through the inlet 16 and the passage 17 in the inner piston 13 urges that piston inwardly and the outer piston 7 outwardly. The inward movement of the inner piston 13 is transmitted through the rods 22 and 23 to the outer piston 6.

Normally fluid is supplied from both sources and both pairs of pistons are actuated simultaneously.

It will be appreciated that in the event of failure of one of the pressure sources or of one of the pipe lines both shoes will still be actuated with 50 percent of the normal force for a given pedal pressure.

Normally, when both pressure sources are in operation their effect is additive.

In the modified arrangement shown in FIGS. 4, 5 and 6, 25 and 26 are the outer pistons working in opposite ends of a through bore 27 of uniform diameter in a cylinder 28. An inner piston 29 works in an axial blind bore in the outer piston 25 and an inner piston 30 works in an axial blind bore in the outer piston 26. Pushers 31, 32 are slidably mounted in the cylinder between the inner ends of the outer pistons. The pusher 31 is adapted to engage the inner end of the outer piston 25 and has integral axially extending push-rods 33 passing through holes in the pusher rod 32 and adapted to be engaged by the inner end of the inner piston 30. The pusher 32, which is adapted to engage the inner end of the outer piston 26, carries similar axially extending push-rods 34 passing through holes in the pusher 31 and adapted to be engaged by the inner end of the piston 29.

The push-rods do not engage directly with the inner pistons but with inserts 35 having part-spherical outer faces co-operating with complementary seatings in the inner ends of the pistons. These inserts can rock to accommodate any difference in the lengths of the push-rods and prevent the application to the inner pistons of any side thrust which might cause them to bind in the outer pistons.

Fluid under pressure is supplied to the outer ends of the recesses in the outer pistons through flexible pipes (not shown) connected to the pistons.

FIG. 4 shows the pistons in their static positions. Radial shoulders 36 on the outer pistons are in engagement with the ends of the cylinder and the inner pistons are in engagement with the outer ends of the recesses in the outer pistons.

FIG. 5 shows the pistons in the positions they assume when the brake is fully applied. Both inner pistons have moved inwardly and each of the outer pistons has been moved outwardly by the fluid pressure in the blind bore within itself and by the fluid pressure in the blind bore in the other piston acting through the inner piston in that bore and the appropriate pusher and push-rods. The fluid pressure in both systems is thus acting on both shoes.

In this condition of the actuator there will be a small clearance (not shown) between the pusher 31 and the inner end of the inner piston 29 and between the pusher 32 and the inner end of the inner piston 30.

Figure 6:
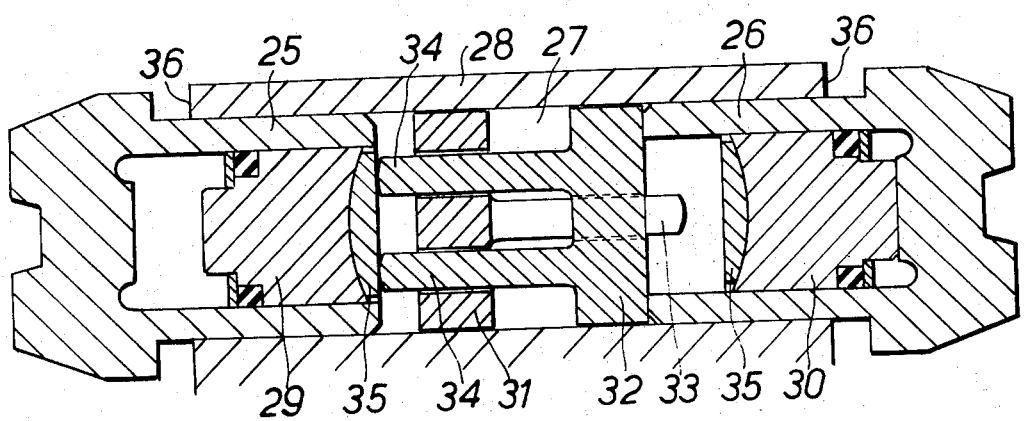
FIG. 6 is a similar section showing the parts in the positions they assume when the brake is fully applied with an hydraulic system inoperative.

FIG. 6 shows the pistons in the positions they assume when the system supplying fluid to the recess in the outer piston 26 has failed. There has been no axial movement of the inner piston 30 in the outer piston 26 but the outer piston 25 has been moved outwardly by the fluid pressure between itself and the inner piston 29 which has moved the outer piston 26 outwardly through the pusher 32 and push-rods 34.

The effort applied to the shoes is reduced to one half of the normal effort but no extra fluid is required from the system which is still operative.

In the embodiment shown in FIGS. 7, 8, 9 and 10 outer pistons 40, 41 work in opposite ends of a through bore in a cylinder 42, and inner pistons 43 and 44 respectively work in axial blind bores in the outer pistons 40 and 41.

The skirt of the piston 40 is formed with two diametrically opposed axially extending fingers 45 which are slidably received in diametrically opposed axially extending slots 46 in an inward extension 47 of the skirt of the piston 41. The fingers pass through slots 48 in opposite sides of the enlarged inner end of the inner piston 43 as shown more particularly in FIG. 8, and their free ends are adapted to be engaged by an extension 49 of the inner end of the inner piston 44 which is of Tee cross-section shown in FIG. 10. The head of the Tee slides in the slots 46 in the skirt extension of the piston 41, and the stem 50 of the Tee is accommodated in a slot 51 in the lower part of the skirt and receives a connection for a flexible pipe supplying fluid under pressure to an axial passage 52 in the inner piston leading to its outer end. A similar connection is made at 53 to the inner piston 43 in which there is an axial passage 54 leading to its outer end.

The flexible pipes are brought in through an opening 55 in the wall of the cylinder.

When pressure fluid is supplied to the inner piston 43 the outer piston 40 is urged outwardly and the inner piston is urged inwardly and its inner end bears on the inner end of the extension 47 of the outer piston 41 and urges that piston outwardly.

At the same time pressure fluid from a separate source supplied to the inner piston 44 urges the outer piston 41 outwardly and the inner piston is urged inwardly and bears against the free ends of the fingers 45 on the outer piston 40 to urge that piston outwardly.

In the embodiment shown in FIGS. 11 to 15 two opposed outer pistons 60, 61 work in opposite ends of a through bore in a cylinder 62 and are slotted at their outer ends to receive the ends of the webs of opposed brake shoes.

The outer piston 60 has on its inner end axially extending diametrically opposed fingers 63, and the outer piston 61 carries two similar fingers 64 angularly displaced by 90° from the fingers 63.

An inner piston 65 working in a blind axial bore 66 in the inner end of the outer piston 60 has on its inner end an integral head 67 of the form shown in FIG. 15 with flat top and bottom surfaces 68. This head is adapted to slide in the slots 69 between the fingers 63 on the outer piston 60 and to engage the inner ends of the fingers 64 on the outer piston 61.

Another input piston 70 working in a blind bore 71 in the inner end of the outer piston 61 has at its inner end a head 72 of the same cross-section as the head 67 but with the flats at right angles to those on the head 67. The head 72 is adapted to slide between the fingers 64 on the outer piston 61 and to engage the inner ends of the fingers 63 on the piston 60.

A connection for a flexible pipe from a source of fluid under pressure is made to socket 73 in the inner piston 70 which is accessible through an opening 74 in the cylinder wall. A connection for a flexible pipe from a separate source of fluid under pressure is made to a socket 75 in the outer piston 60 as shown in FIG. 14 which also shows a socket 76 to receive a bleed valve. These sockets lead into the blind end of the bore 66 in the piston 60.

The operation of this embodiment is the same as in the embodiments described above. Fluid under pressure fed to the inner piston 70 flows through the axial passage 77 in the piston to the closed end of the bore 71 and the outer piston 61 is urged outwardly while the inner piston is urged inwardly and bears on the fingers 63 to urge the outer piston 60 outwardly.

At the same time fluid from another source fed to the inner end of the bore 66 in the outer piston 60 urges that piston outwardly and urges inwardly the inner piston 65 which bears on the fingers 64 on the piston 61 to urge that piston outwardly.

Our invention has been illustrated as applied to the actuation of the shoes of a shoe-drum brake, but it will be appreciated that our improved actuator could also be used for actuating the friction pads of a disc brake. For example the cylinder could be mounted on a stationary carrier at one side of a brake disc with one outer piston acting directly on a friction pad engaging the adjacent face of the disc and the other outer piston acting on a yoke extending across the plane of the disc and carrying a friction pad for engagement with the opposite face of the disc.

We claim:

1. A brake actuator comprising a double-ended hydraulic cylinder in which work opposed outer pistons acting on movable friction members of the brake, each outer piston having in its inner end a blind bore, an inner piston working in each of said blind bores, means for supplying hydraulic fluid under pressure from two separate sources to the closed ends of the respective blind bores in the two outer pistons to urge apart each outer piston and the inner piston working in the bore in that piston, and mechanical means having operative engagement with each inner piston and abutting engagement with the outer piston at the opposite end of the cylinder for transmitting in a brake applying direction axial movement of each inner piston to the respective opposite outer piston whenever fluid pressure sufficient to move said inner piston is applied to each of the respective blind bores, the volume of working fluid in either one of the blind bores during brake application being unaffected by failure of the pressure source for supplying the other blind bore.

2. The actuator of claim 1 wherein the mechanical means comprise push rods moveable axially by each inner piston against each opposite outer piston through axial openings in the inner piston.

3. An hydraulic brake actuator as in claim 1 wherein said hydraulic cylinder wall has an opening therein, an axial fluid passage in each of said inner pistons extending between the blind ends of the bores and the opening in the cylinder wall, and means at the end of each passage at said opening adapted to have connected thereto a flexible pipe.

4. An hydraulic brake actuator as in claim 1 wherein the mechanical means comprises angularly spaced axially extending fingers on each outer piston passing through slots in the inner end of the inner piston working in that outer piston and adapted to be engaged by a head on the inner end of the inner piston working in the other outer piston.

5. An hydraulic brake actuator as in claim 1 wherein the mechanical means comprises pushers slidably mounted in the cylinder between the pistons, each pusher being adapted to engage the inner end of one outer piston and having spaced axially extending fingers adapted to pass slidably through the other pusher and to be engaged by the inner end of the inner piston working in the other outer piston.

6. An hydraulic brake actuator as in claim 5 wherein a rocking insert is mounted in the inner end of each inner piston for engagement by the fingers on a pusher.

* * * * *